United States Patent Office 3,428,659
Patented Feb. 18, 1969

3,428,659
PREPARATION OF BROMAMINIC ACID
Dominic A. Zanella, Lock Haven, Pa., assignor to American Aniline Products, Inc., a corporation of Delaware
No Drawing. Filed Feb. 17, 1966, Ser. No. 528,041
U.S. Cl. 260—371
Int. Cl. C07c *143/36;* C09b *1/24*
5 Claims This invention relates to the preparation of 1-amino-4-bromo-anthraquinone-2-sulfonic acid, commonly known as bromaminic acid, a valuable intermediate in the manufacture of dyestuffs of the alpha-aminoanthraquinone series.

Bromaminic acid is ordinarily made by reacting 1-aminoanthraquinone with at least a stoichiometric amount of chlorosulfonic acid in the presence of an inert organic solvent. The resulting 1-aminoanthraquinone-2-sulfonic acid is then suspended in water and treated directly with bromine to form bromaminic acid. A number of problems have been encountered in the bromination reaction which have made it difficult to obtain commercially attractive yields of bromaminic acid. Care must be taken to avoid reaction conditions that cause desulfonation, and the bromination must be carried out so as to prevent dibromation of the 1-aminoanthraquinone-2-sulfonic acid.

For many years it was believed that the success of the bromination depended upon the particle size of the 1-aminoanthraquinone-2-sulfonic acid. To attain the proper particle size the sulfonic acid intermediate was salted out by adding a concentrated aqueous salt solution and, following completion of the salting out operation, the mixture was agitated for a lengthy time period to provide a suspension for optimum bromination. The salting out process was improved to a limited extent by employing a reverse salting out procedure for preparing the suspension. Even with this improved method, the yields of bromaminic acid were only about 85% and the undesired dibrominated compound was formed in an amount of about 4%.

I have discovered a novel method that surprisingly substantially eliminates the formation of dibromated compound and provides yields of bromaminic acid greater than 90%, based on pure 1-aminoanthraquinone.

It is therefore an object of the present invention to provide a new method for making bromaminic acid of excellent purity in yields higher than those heretofore obtainable.

In accordance with the invention 1-aminoanthraquinone is reacted with at least a stoichiometric quantity of chlorosulfonic acid in the presence of an inert organic solvent. The resulting 1-aminoanthraquinone-2-sulfonic acid is converted to its alkali metal salt by reaction with a basic alkali metal salt, such as sodium carbonate or sodium hydroxide. Bromination is carried out in the presence of at least a stoichiometric quantity, based on the quantity of hydrogen bromide formed during bromination, of an acid-binding agent which, when added in the appropriate quantity, provides a reaction mixture of substantially neutral pH. Bromaminic acid, in the form of its alkali metal salt, is recovered from the reaction mixture in yields exceeding 90% of theory, based on pure 1-aminoanthraquinone.

The sulfonation of 1-aminoanthraquinone is carried out generally according to the teachings of U.S. Patent 2,135,346. 1-aminoanthraquinone is suspended in a suitable high-boiling inert organic solvent and chlorosulfonic acid is slowly added thereto under agitation. The reaction is generally completed over a period of 6 to 15 hours.

Any high-boiling inert organic solvent can be used for the reaction although it is preferable to choose one boiling between 110° C. and 175° C. Suitable solvents include aromatic solvents such as monochlorobenzene, toluene, xylene, ortho-dichlorobenzene, ethylbenzene, and high-boiling chlorinated aliphatic solvents such as tetrachloroethane.

At temperatures below 110° C. the reaction is sluggish and at temperatures substantially above 175° C. there is the possibility of adverse effect on the product. Preferred temperatures are those ranging between 125°–160° C. It is important from the standpoint of the yield of 1-aminoanthraquinone-2-sulfonic acid intermediate to conduct the reaction at the reflux temperature of the reaction mixture which, of course, depends on the choice of solvent. At reflux the HCl formed during the reaction is readily eliminated, which aids in driving the reaction to completion and avoids the presence of excess free acid in the reaction mixture.

At least a stoichiometric quantity, and preferably a slight excess, of chlorosulfonic acid should be used, to insure complete sulfonation. After sulfonation is complete the reaction mixture is allowed to cool. The sulfonation mass is then diluted with a substantial quantity of cold water, conveniently approximately equal to the amount of solvent present.

A basic alkali metal salt, e.g., sodium carbonate, potassium carbonate, sodium hydroxide, or potassium hydroxide, is added to the reaction mixture to neutralize any excess chlorosulfonic acid and to form the alkali metal salt of the 1-aminoanthraquinone-2-sulfonic acid. Care should be taken during the neutralization step to avoid adding excess base, since bromination in alkaline medium will result in the formation of substantial quantities of 1-amino-4-hydroxyanthraquinone-2-sulfonic acid rather than the desired 1-amino-4-bromoanthraquinone-2-sulfonic acid. The pH of the mixture at this point should not exceed 8 and should preferably be in the range of 6.5–7.5.

After neutralization of the excess chlorosulfonic acid and the formation of the alkali metal salt of 1-aminoanthraquinone-2-sulfonic acid, an acid-binding agent is added to the reaction mixture in an amount sufficient to neutralize the HBr formed during the subsequent bromination. The acid-binding agent must be one which, when added in the appropriate quantity, provides a reaction mixture of substantially neutral pH since, as noted above, it is undesirable to bromate in an alkaline medium. Particularly useful acid-binding agents are the alkali metal bicarbonates, e.g., sodium bicarbonate and potassium bicarbonate, the alkali metal acetates, e.g., sodium acetate and potassium acetate, and the alkali metal bisulfites, e.g., sodium bisulfite and potassium bisulfite.

Bromination is conducted in the conventional manner by cooling reaction mixture to a temperature of 5°–10° C. and introducing bromine under the surface of the mixture over a period of 2–5 hours. After the addition of bromine is complete, the mass is allowed to react for an additional few hours and is warmed to room temperature.

Soda ash or other suitable base is added to eliminate any free acid and the mixture is steam distilled to remove the organic solvent. The residual mass is filtered and the cake is washed with an appropriate quantity of hot water. The cake is primarily 1-amino-2-bromoanthraquinone, which is of sufficient purity to be used directly as a dyestuff intermediate.

The filtrate is clarified, washed and cooled to room temperature whereupon the product, the alkali metal salt of a bromaminic acid, precipitates therefrom. The product is washed with ice water and dried in the conventional manner. It is of excellent purity and is obtained in yields averaging 90–95%, based on pure 1-aminoanthraquinone.

My invention is further illustrated by the following examples:

EXAMPLE I

To a 3-liter, 4-neck flask, provided with a reflux condenser, agitator, thermometer and dropping funnel there were charged 960 g. monochlorobenzene and 96 g. 1-aminoanthraquinone. The mixture was heated to 130° C. to eliminate residual water. It was then cooled to 30° C. and over a ½-hour period 60 g. of chlorosulfonic acid was added dropwise thereto. After the addition of the chlorosulfonic acid, the mixture was heated to reflux (134°–136° C.) over a 2-hour period. After refluxing the mixture for 12 hours it was allowed to cool to 30° C.

To the sulfonation mass there was added 1,000 ml. ice water. After stirring for ½ hour 37 g. soda ash was added to neutralize excess chlorosulfonic acid and to form the sodium salt of 1-aminoanthraquinone-2-sulfonic acid. The mixture was allowed to stir for ½ hour and 36 g. anhydrous sodium acetate was added thereto. The resulting mixture was cooled to 5° C. by external means and, at 5–10° C., 70 g. bromine was introduced below the surface of the mixture over a period of three hours. After stirring for an additional three hours the mass was allowed to warm overnight to room temperature. There was then added 33.5 g. soda ash to neutralize any acid present and the mass was transferred to a steam distillation flask wherein the monochlorobenzene was removed. The residual mass was filtered at 95° C. and the cake thus obtained was washed with three 100 ml. portions of boiling water. The cake was dried to give 10.5 g. of 1-aminobromoanthraquinone (bromine content 24.5%) of sufficient purity that it could be used directly as a chemical intermediate.

To the filtrate obtained after the bromination step there was added 10 g. of activated charcoal and the mixture was heated to 90° C. There was then added 10 g. of a filter aid and the mass was heated to 98° C. The impurities along with the charcoal and filter aid were filtered off and washed with three 100 ml. portions of boiling water. The filtrate was allowed to stir and cooled overnight. It was then filtered at 23° C. and the cake thus obtained was washed with four 50 ml. portions of ice water and thereafter dried at 80° C. There was thus obtained 150.5 g. of the sodium salt of bromaminic acid (bromine content 18.4%), representing a yield of about 93.5% based on pure 1-aminoanthraquinone.

EXAMPLE II

By following the above procedure with the substitution of sodium bicarbonate for the sodium acetate used in Example I correspondingly high yields of substantially pure bromaminic acid are obtained.

EXAMPLE III

By following the procedure of Example I with the substitution of sodium bisulfite for the sodium acetate used in Example I correspondingly high yields of substantially pure bromaminic acid are obtained.

EXAMPLE IV

The procedure of Example I was substantially repeated with the exception that the quantity of chlorosulfonic acid added was reduced to 52.5 g. to avoid the presence of any substantial excess of acid in the reaction mixture. Sulfonation was conducted at a temperature of 120–125° C. and, subsequent to the sulfonation, the step of neutralizing the free acid and converting the 1-aminoanthraquinone-2-sulfonic acid to its sodium salt was omitted. Sodium acetate was added as the acid-binding agent and bromination was conducted as described in Example I. At the completion of the bromination 60 g. soda ash was required to neutralize the free acid. There was thus obtained 118.5 g. of the sodium salt of bromaminic acid (bromine content 18.4%) and 41 g. of 1-aminobromoanthraquinone (bromine content 25.6%).

It is thus seen that although the acid-binding agent substantially eliminates the formation of dibromated anthraquinone, the yield of bromaminic acid is measurably reduced if the bromination is not conducted in a substantially neutral reaction medium. Neutralization followed by conversion of 1-aminoanthraquinone-2-sulfonic acid to its alkali metal salt provides a reaction medium with a pH ranging between about 6.5 and 7.5, thus eliminating the danger of desulfonation which can occur readily at acid pH. Care is taken to avoid the addition of excess base during the neutralization step which would provide a bromination medium having a pH greater than 8, which in turn would result in the undesirable formation of measurable amounts of 1-amino-4-hydroxyanthraquinone-2-sulfonic acid as a by-product.

I claim:

1. In a method for the production of bromaminic acid wherein 1-aminoanthraquinone is reacted with at least a stoichiometric quantity of chlorosulfonic acid in the presence of an inert organic solvent and the resulting 1-aminoanthraquinone-2-sulfonic acid is treated with bromine in the presence of water to form bromaminic acid, the improvement comprising adding, after the sulfonation step but prior to bromination, a basic alkali metal salt in a quantity sufficient to neutralize any excess acid and to form the alkali metal salt of the 1-aminoanthraquinone-2-sulfonic acid while maintaining a substantially neutral pH and thereafter adding at least a stoichiometric quantity, based on the quantity of HBr formed during bromination, of an acid-binding agent which, when added in the appropriate quantity, provides a reaction mixture of substantially neutral pH.

2. Method according to claim 1 wherein the acid-binding agent is selected from the group consisting of alkali metal bicarbonates, alkali metal acetates, and alkali metal bisulfites.

3. Method according to claim 2 wherein the acid-binding agent is sodium acetate.

4. Method according to claim 1 wherein the sulfonation mass is neutralized and the 1-aminoanthraquinone-2-sulfonic acid is converted to its sodium salt by the addition of sodium carbonate.

5. Method according to claim 1 wherein the pH of bromination mixture ranges between 6.5 and 7.5.

References Cited

UNITED STATES PATENTS

| | | | |
|---|---|---|---|
| 2,251,688 | 6/1941 | Ogilvie et al. | 260—371 |
| 2,413,790 | 1/1947 | Seymour et al. | 260—371 |
| 2,440,760 | 5/1948 | Seymour et al. | 260—371 |
| 2,581,016 | 1/1952 | Grossmann | 260—371 |
| 2,590,247 | 3/1952 | Hieserman | 260—371 |

FOREIGN PATENTS

| | | |
|---|---|---|
| 263,395 | 8/1913 | Germany. |

LORRAINE A. WEINBERGER, *Primary Examiner.*

H. C. WEGNER, *Assistant Examiner.*